May 10, 1955 D. H. WESTWOOD 2,708,258
ANTI-HUNT CIRCUIT FOR ELECTRIC MOTOR FOLLOW-UP SYSTEMS
Filed Dec. 29, 1949 2 Sheets-Sheet 1

INVENTOR
David H. Westwood
BY
ATTORNEY

May 10, 1955  D. H. WESTWOOD  2,708,258
ANTI-HUNT CIRCUIT FOR ELECTRIC MOTOR FOLLOW-UP SYSTEMS
Filed Dec. 29, 1949  2 Sheets-Sheet 2
Fig_4
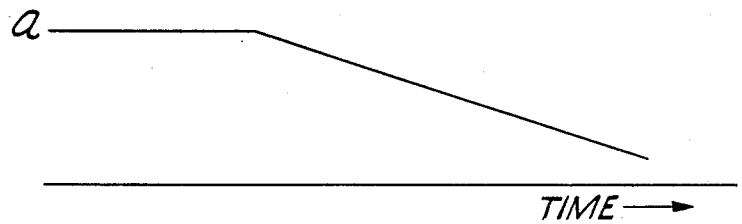
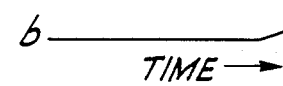
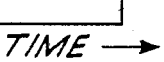
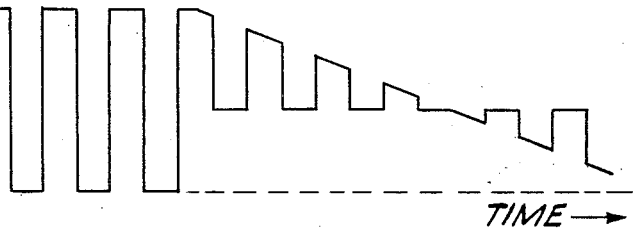
INVENTOR
David H. Westwood
BY
ATTORNEY United States Patent Office 2,708,258
Patented May 10, 1955

2,708,258

ANTI-HUNT CIRCUIT FOR ELECTRIC MOTOR FOLLOW-UP SYSTEMS

David H. Westwood, Haddonfield, N. J., assignor to Radio Corporation of America, a corporation of Delaware Application December 29, 1949, Serial No. 135,572

16 Claims. (Cl. 318—28)

This invention relates to servo and motor control systems.

It is a desirable practice in servo and the like systems to introduce with the error voltage into a voltage responsive control system a voltage proportional to the rate of change of the error voltage. As well understood in the servo art, such a rate of change voltage when added to the error signal assists in avoiding hunting and overshooting. Many ways have been proposed to provide the addition of such a rate of change voltage. In many systems where simplicity is desired, it is often desirable to introduce such a rate of change voltage with a minimum of costly components.

It is an object of the present invention to improve circuits in which a signal is derived which is the sum of voltages proportional to the voltage from a source and to the rate of change of the source voltage.

It is another object of the invention to improve circuits of the type in which a rate of change signal is employed, and which circuits are typically used in servo systems.

It is another object of the invention to provide a circuit which is especially suited and adapted to use with systems in which the signal to which the rate of change voltage is to be added comes from a high impedance source.

These and other objects, advantages, and novel features of the invention will be more apparent from the following description when taken in connection with the accompanying drawing in which like reference numerals refer to like parts; and Fig. 1 is a schematic diagram illustrating one of the prior proposals for introducing a change of rate signal into an error voltage;

Figs. 4a to 4e are wave forms helpful in understanding the operation of the device of Fig. 2.

Figure 1:
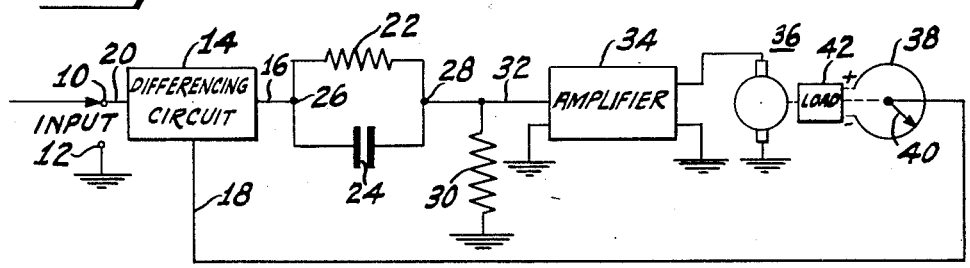

Referring now more particularly to Fig. 1, a control voltage is applied from an input source (not shown) between terminals 10 and 12, the latter terminal being connected to a conventional common ground conductor. The terminal 10 is connected to a differencing circuit 14 of any of various common, well-known types and which may comprise merely a resistor network whereby the voltage on the lead 16 connected to the circuit 14 is proportional to the difference between the voltages on the leads 18 and 20 connected to the circuit 14. A resistor-capacitor network comprising a parallel-connected resistor 22 and capacitor 24 having one junction 26 connected to the lead 16 and a resistor 30 connected between ground and the other junction 28, is a network of the type sometimes employed in the prior art for obtaining on the output lead 32 a voltage which is the sum of a voltage proportional to that on the lead 16 and one proportional to the rate of change of this difference voltage on the lead 16.

The components of the network comprising resistors 22 and 30 and capacitor 24 are chosen to given substantially this result. Thus the resistance of resistor 22 may be chosen to be approximately 10 times the resistance of the resistor 30. The voltage on the output lead 32 is applied to an amplifier 34 which actuates a motor 36 which may be mechanically connected to a load device 42 to be positioned in accordance with the voltage on lead 16. The contact arm 40 of a rheostat 38 is mechanically connected to load 42. The angular position of the arm 40 is thus varied in accordance with the position of the load 42. The system is arranged, of course, so that the motor 36 drives the load 42 in response to the voltage on lead 32 in a direction to cause the voltage picked up at arm 40 and applied to lead 18 to approach the voltage on lead 20 thereby reducing the difference voltage on lead 16. Although the simplicity of this system recommends it under certain circumstances, the network comprising resistors 22 and 30 and capacitor 24 has the undesirable attribute that the input on lead 16 is considerably attenuated at the output lead 32, and that noise pick-up, "hash," and the like comprising high frequency components is in general not attenuated but freely passed by the capacitor 24. Furthermore, if this rate network is placed across a high impedance source, a shunt capacitor to by-pass the high frequency components is not practicable because of its reactive loading effect on the source and a loss of sensitivity results.

Figure 2:
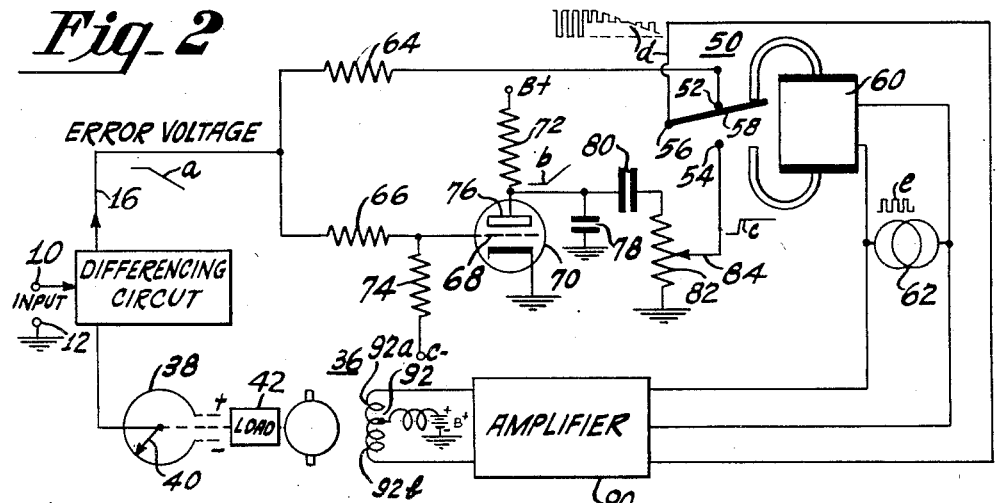
Fig. 2 is a schematic diagram illustrating the circuit of the invention in conjunction with a servo system.

Referring now to Fig. 2, I utilize a different rate network. As illustrated in Fig. 2 the system includes a "chopper" or "interrupter" 50 comprising two terminals or contacts 52 and 54, a terminal 56, and a contact arm 58 actuated by a polarized relay 60. The voltage from an alternating source 62 is applied to the windings of the polarized relay 60. The source 62 may be a source of square wave voltage, whereby the contact arm 58 alternately and successively makes connections with the contacts 52 and 54 thereby alternately and successively connecting them to terminal 56. Source 62 has a fundamental frequency preferably high compared to the voltage variations on lead 16, which is the error voltage of the system. Other means, such as multivibrators and the like, are known for securing the alternately repeated switching described. Contact 52 is connected to error voltage lead 16 through an isolating resistor 64. The error voltage is also applied from lead 16 through another isolating resistor 66 to the grid 68 of an inverter tube 70 having a suitable anode load resistor 72 and a B+ supply (not shown). A suitable C— supply (not shown) is applied through a grid resistor 74 to the grid 68 of the tube 70. The tube 70 preferably is an amplifying unit having cathode, grid, and anode elements and serves to invert and amplify the signal from lead 16 which therefore appears in inverted form at anode 76. A capacitor 78 is connected between the anode and cathode for reasons which appear hereinafter. A differentiating circuit comprising a serially connected capacitor 80 and a resistor 82 is connected between the anode 76 and ground. A suitable portion of the voltage across resistor 82 is selected by a resistor contact arm 84 and applied to contact 54 of interrupter 50.

A second amplifier 90 receives the voltage from source 62 and from terminal 56 of interrupter 50. These voltages are amplified and passed through the windings 92 of motor 36. This motor is such that if current through one of the windings 92a on the average exceeds current through another of the windings 92b, the motor runs one way and vice versa. The motor runs the load 42 and the potentiometer arm 40 mechanically connected thereto.

Figure 3:
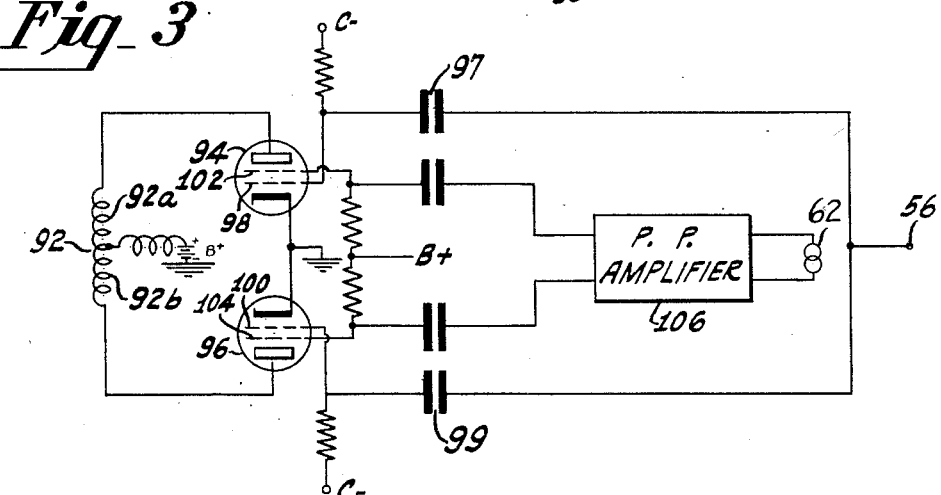
Fig. 3 is a schematic diagram illustrating in greater detail one of the components of Fig. 2.

The amplifier 90 may be an arrangement such as that illustrated in Fig. 3, B+ voltage being supplied a pair of tetrodes 94 and 96 through winding 92. The signal voltage from terminal 56 is applied to the control grids 98 and 100 of tubes 94 and 96 respectively. The square wave signal from source 62, which may be first amplified by a push-pull amplifier 106, is applied to screen grids 102 and 104 of tubes 94 and 96 respectively. The voltage at the screen grids 102 and 104 alternately cuts off the tubes 94 and 96, so that each conducts in proportion to the signal amplitude on grids 98 and 100 derived from terminal 56. Signals from movable switch arm terminal 56 are fed through blocking capacitors 97 and 99 to control grids 98 and 100 respectively, as shown. However, these signals may also be amplified or filtered if desired (not illustrated).

In operation, the error voltage on lead 16, may have a wave form such as that in Fig. 4a, as an idealized example. The error voltage considered as a signal voltage, appears at the anode 76 inverted as illustrated in Fig. 4b. The differentiated inverted signal then appears at contact 54 as shown in Fig. 4c. Consider now the voltage at terminal 56, which will be, alternately, the voltage at contact 52 (of the form of the curve of Fig. 4a) and at contact 54 (of the form of the curve of Fig. 4c), in synchronism with the alternations of source 62. The voltage of source 62 is illustrated in Fig. 4e and immediately above it is illustrated in Fig. 4d the voltage at terminal 56. As the error voltage decreases in magnitude and approaches a zero value, the signal voltage at terminal 56 decreases in amplitude (note the peak-to-peak measure of the alternations) and eventually reverses in phase with respect to the voltage of source 62 at an anticipatory position dependent on the rate of change of the error signal and then increases in amplitude. This means that the current through one of tubes 94, 96 is predominant and not only decreases in amplitude as the load approaches the desired position determined by the input voltage, but that the conduction current in the other of tubes 94, 96 exceeds that of the first at this anticipatory position. This action has the effect of reversing the direction of the field of winding 92 and of the torque on motor 36 in anticipation of the load reaching the desired position. If proper proportions of the error voltage and rate of change signal are employed it is apparent that overshoot of the load and hunting may be substantially eliminated. The system is now termed "critically damped." It is also possible, if desired, by adjusting the relative magnitudes of error voltage and rate of change signal to cause the system to be under-damped or over-damped. In the former condition in general the load will overshoot and oscillate somewhat. In the latter condition in general the load will stop prematurely and creep into the desired position. The proportion of rate of change to error voltage may be controlled by setting potentiometer arm 84. The amplitudes of the total signal at contact 56 may be controlled by a suitable potentiometer in amplifier 90 or by other suitable control means (not shown).

The capacitor 78 is an important and interesting feature whereby high frequency noise and "hash" are by-passed. Such a high pass filter capacitor cannot be used in the circuit of Fig. 1 when a high impedance source is employed for input or error voltage because of the loading on the high impedance source. As employed here, however, it has the desired by-passing effect without the undesired loading effect. Thus the aforementioned objects are attained by a new and novel circuit for adding to a control voltage in desired proportion a rate of change correction voltage, and the system disclosed may include means for rejecting or by-passing undesired high frequency components.

What I claim is:

1. For a system having a source of voltage, a circuit comprising an interrupter having three terminals, two of said terminals being alternately and periodically connected to the third of said terminals, one of said two terminals being connected to said source, an inverter and differentiator connected in tandem to receive said source voltage and having as output signal the inverted source voltage differentiated, the second said terminal being connected to receive said output signal, whereby the signal amplitude at said third terminal is dependent on both the said source voltage and the rate of change thereof.

2. For a system having a source of voltage, a circuit comprising an interrupter having three terminals, two said terminals being alternately and periodically connected to the third said terminal, one of said two terminals being connected to said source, a signal inverter having an input connected to said source and an inverted output, a differentiator connected to receive said inverted output and connected to the other of said two terminals to apply the differentiated output thereto, whereby the signal amplitude at said third terminal is the sum of voltages proportional to the source voltage and proportional to the time derivative of the signal voltage.

3. The circuit claimed in Claim 2, said differentiator comprising a capacitor and a resistor serially connected to receive said inverted output, the differentiated output being taken from across at least a portion of said resistor.

4. The circuit claimed in claim 2, said differentiator comprising a serially connected capacitor and resistor, the circuit further comprising a high-pass filter connected in shunt across said differentiator.

5. The circuit claimed in claim 4, said filter comprising a capacitor.

6. The circuit claimed in claim 1, further comprising a high-pass filter in shunt across the tandem connection of said inverter and differentiator.

7. The circuit claimed in claim 2, said inverter comprising an amplifier including an amplifying unit having cathode, anode and control elements, the said voltage being applied to said control element whereby the inverted signal appears at the anode.

8. The circuit claimed in claim 7, said unit being a vacuum tube.

9. The circuit claimed in claim 2, said inverter comprising an amplifying unit having cathode, control, and anode elements, the said source voltage being applied to said control element and the inverted output being taken from said anode, a high-pass filter comprising a capacitor connected between said anode and cathode, said differentiator comprising a serially connected second capacitor and resistor, one terminal of said second capacitor being connected to said anode and one terminal of said resistor being connected to said cathode, the differentiated output from said differentiator being taken from across at least a portion of said resistor.

10. For a servo system having means to compare an input signal and an an output signal to derive therefrom an error voltage signal, said output signal being dependent upon a positional control system responsive to a control signal voltage and to the phase thereof with respect to predetermined alternating periods, a circuit comprising an interrupter having three terminals, two of said terminals being alternately and periodically in synchronism with said alternating periods connected to the third said terminal, one of said two terminals being connected to receive said error signal voltage, a signal inverter having an input connected to said error voltage signal and an inverted output, a differentiator connected to receive said inverted output and connected to the other of said two terminals to apply the differentiated output thereto, said third terminal being connected to said voltage responsive means to apply voltage thereto.

11. A circuit for advancing the phase of a variable electrical signal comprising, means for inverting said signal, means for differentiating said inverted signal, a utilization circuit and means for alternately and successively impressing said electrical signal and at least a portion of said differentiated inverted signal on said utilization circuit whereby an alternating current signal is produced in said utilization circuit the alternate peak amplitudes of which are proportional to the instantaneous amplitudes of said electrical signal and said differentiated inverted signal.

12. A circuit for advancing the phase of a variable electrical signal comprising, a discharge tube having said variable electrical signal impressed on the input thereof producing an amplified output signal which is the inverse of said input signal, a differentiating circuit connected to the output of said discharge tube for differentiating said output signal, a utilization circuit and means alternately and successively impressing said input signal and at least a portion of said differentiated signal on said utilization circuit whereby an alternating current signal is impressed on said utilization circuit the alternate peak amplitudes of which are proportional to the instantaneous amplitudes of said input signal and differentiated signal.

13. A circuit for advancing the phase of a variable electrical signal comprising a discharge tube having said variable electrical signal impressed on the input thereof producing in the output circuit thereof an amplified inverted signal, a resistance reactance differentiating circuit connected to the output of said discharge tube for differentiating the output signal thereof, a first circuit connected to said differentiating circuit, a second circuit connected to the input of said discharge tube, a utilization circuit and means for alternately and successively energizing said utilization circuit by signals derived from said first and second circuits.

14. A circuit for advancing the phase of a variable electrical signal comprising, a discharge tube having said variable electrical signal impressed on the input thereof producing in its output circuit an amplified inverted signal, a resistance capacitance differentiating circuit connected in the output of said discharge tube for differentiating the output signal thereof, a first stationary contact connected to said differentiating circuit, a second stationary contact connected to the input circuit of said discharge tube, a movable contact and means for causing said movable contact to alternately and successively engage said first and second stationary contacts.

15. A circuit for advancing the phase of a variable electrical signal comprising, a discharge tube having said variable electrical signal impressed on the input thereof producing in its output circuit an amplified inverted signal, a resistance capacitance differentiating circuit connected to the output circuit of said discharge tube for differentiating the output signal thereof, a relay having a single movable contact and a pair of stationary contacts arranged for alternate engagement by said movable contact, a magnetic coil energized by an alternating current source actuating said movable contact between its alternate positions of engagement at the frequency of said alternating current, a direct connection between one of said pair of stationary contacts and said resistance capacitance differentiating circuit and a direct connection between the other of said pair of stationary contacts and the input of said discharge tube.

16. A circuit for advancing the phase of a variable electrical signal comprising, a discharge tube having at least an anode, cathode and control electrode, a circuit for impressing said variable electrical signal on said control electrode, a condenser and resistor connected in series between said anode and cathode, a relay having a movable contact and a pair of stationary contacts arranged for alternate engagement by said movable contact, an actuating coil for said relay energized by an alternating current source actuating said movable contact to its alternate positions of engagement at the frequency of said alternating current, a circuit connecting one of said pair of stationary contacts to the juncture of said condenser and resistor, and a circuit connecting the other of said pair of stationary contacts to said control electrode.

References Cited in the file of this patent

UNITED STATES PATENTS

| | | |
|---|---|---|
| 2,499,222 | Hofstadter | Feb. 28, 1950 |
| 2,508,082 | Wald | May 16, 1950 |
| 2,520,462 | Hartung | Aug. 29, 1950 |
| 2,590,528 | Gilbert | Mar. 25, 1952 |

OTHER REFERENCES

"Radio-Electronic Engineering," August 1948; vol. 11, issue 2, pp. 14, 15 and 28, "D. C. Operated Servo Amplifier," by Sidney Wald.

Theory of Servomechanisms, James Nichols and Phillips, McGraw-Hill Book Co., 1947, page 125.